Jan. 30, 1940.   B. J. ANDERSON   2,188,561

SUBFRAME MEMBER FOR VELOCIPEDES

Filed June 18, 1937

BERT J. ANDERSON
INVENTOR.

BY Leon T. Hooper
ATTORNEY.

Patented Jan. 30, 1940

2,188,561

UNITED STATES PATENT OFFICE 2,188,561

SUBFRAME MEMBER FOR VELOCIPEDES

Bert J. Anderson, Hammond, Ind.

Application June 18, 1937, Serial No. 148,842

2 Claims. (Cl. 280—291)

This invention relates to an improved subframe member for velocipedes which in the preferred embodiment of the invention is secured to the under surface of the rear portion of a stamped velocipede.

One of the principal objects of importance and advantage of the invention resides in the provision of means for securing an axle between the upper surface of the subframe and the under surface of the velocipede frame proper.

Another important object of advantage resides in the provision of means for maintaining the downwardly turned axle supporting ends of a velocipede frame in operable alignment.

Additional objects of importance and advantage will become apparent as the following detailed description progresses, reference being had to the accompanying drawing wherein.

As shown in the drawing.

Figure 1:
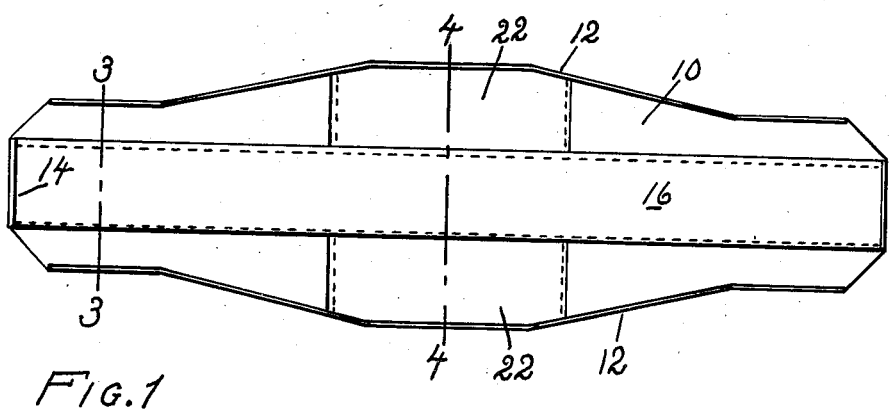
Fig. 1 is a top plan view of a subframe member which embodies the invention.
Figure 2:
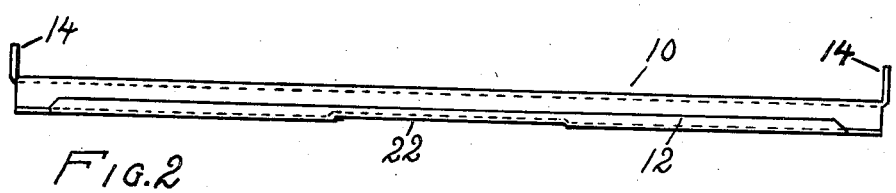
Fig. 2 is a side elevational view thereof.
Figure 3:
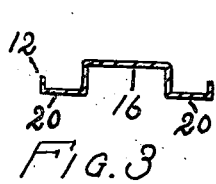
Fig. 3 is a section taken on line 3—3 of Fig. 1.
Figure 4:
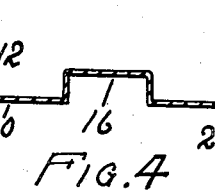
Fig. 4 is a section taken on line 4—4 of Fig. 1.
Figure 5:
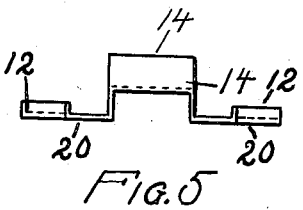
Fig. 5 is an end elevational view of the device.

The reference numeral 10 indicates in general the body of the subframe member of this invention which in its preferred form is constructed of a single stamping and has downwardly turned front and rear edges 12 and ends 14.

Extending longitudinally of the body 10 is a channel shaped formation 16 which is adapted to receive an axle. The axle is shown in dotted lines in Fig. 6 and is indicated by reference numeral 18. The channel formation 16 in addition to serving as a housing for the axle 18 also provides a means preventing torsional strain from causing injury to the structure.

The portion of the body intermediate the channel shaped formation 16 and each downwardly turned edge 12 is flat and is adapted to be secured against the under surface of a rear frame member. The flat securing surface is indicated by the reference numeral 20.

Formed in each securing surface 20 intermediate the ends thereof is a slight depression 22. When the device is in assembly with a rear frame member the depression 22 provides an opening to receive backbone securing means between the lower surface of a rear frame member and the upper surface of the subframe.

In the preferred embodiment of the invention the downwardly turned ends 14 are adapted to extend parallel to and be in contact with the downwardly turned axle supporting ends of a rear frame member.

Figure 6:
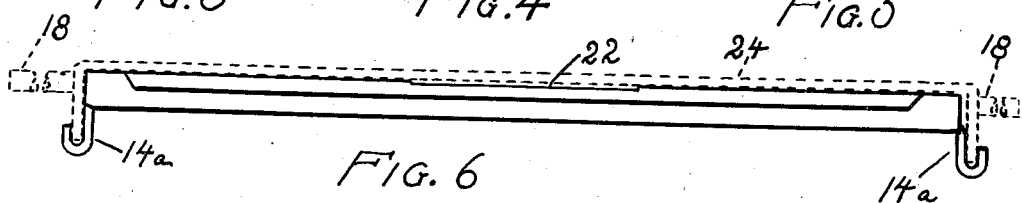
Fig. 6 is a side elevational view of the device in assembly with a rear frame member and shows a slight modification thereof.

In the slight modification of the preferred embodiment as shown in Fig. 6 the downwardly turned ends 14a are adapted to be crimped over the lower edge of a rear frame member 24. The rear frame member is shown in dotted lines in Fig. 6 and is indicated by the reference numeral 24.

It will be obvious that any portion or portions of the downwardly turned edges 12 may also be extended and be crimped to a velocipede frame.

It will be obvious from the foregoing that herein is provided a subframe member which readily lends itself to incorporation in various types and kinds of velocipedes.

It will also be apparent that various changes in design and construction may be made without departing from the spirit of this invention.

I claim as my invention:

1. A subframe for velocipedes comprising a stamping adapted to be positioned against the under side of a deck plate, said stamping having downwardly turned side edges adapted to engage the inner surface of a deck plate, a depressed surface in the central portion of said stamping providing accommodations for housing backbone-securing-means when a backbone is secured to said deck plate, an axle receiving formation extending from one end of said stamping to the other end thereof, and each end of said stamping being turned at right angles to the body thereof for attachment to the downwardly turned ends of a deck plate.

2. A subframe for velocipede deck plates comprising a stamping having downwardly turned edges and ends, portions of said stamping intermediate the longitudinal center line thereof and each downwardly turned edge being adapted to engage the lower surface of a deck plate, the central upper surface of said stamping being depressed, a channel shaped formation extending the entire length of said stamping, and the metal at each end of said channel extending downwardly and being adapted to be secured to the downwardly turned end of a deck plate.

BERT J. ANDERSON.